(12) United States Patent
Zhu et al.

(10) Patent No.: US 11,272,371 B2
(45) Date of Patent: Mar. 8, 2022

(54) METHOD AND APPARATUS FOR UNMANNED AERIAL VEHICLE AUTHENTICATION

(71) Applicant: Huawei Technologies Co., Ltd., Shenzhen (CN)

(72) Inventors: Haoren Zhu, Shanghai (CN); Zhixian Xiang, Cupertino, CA (US); Gang Li, Shanghai (CN); Cuili Ge, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 16/388,566

(22) Filed: Apr. 18, 2019

(65) Prior Publication Data
US 2020/0336901 A1 Oct. 22, 2020

(51) Int. Cl.
*H04W 12/37* (2021.01)
*H04L 29/08* (2006.01)
*H04W 12/06* (2021.01)
*H04W 12/61* (2021.01)
*H04L 67/12* (2022.01)

(52) U.S. Cl.
CPC ............ *H04W 12/37* (2021.01); *H04L 67/12* (2013.01); *H04W 12/06* (2013.01); *H04W 12/61* (2021.01)

(58) Field of Classification Search
CPC .......... H04L 67/12; H04W 12/06–088; H04W 12/30–64
See application file for complete search history.

(56) References Cited

U.S. PATENT DOCUMENTS 8,418,233 B1 * 4/2013 Hughes ............... H04L 63/205
726/5
2003/0216143 A1 * 11/2003 Roese ................. H04L 63/107
455/456.1
(Continued)

FOREIGN PATENT DOCUMENTS

CN 105225540 A 1/2016
CN 108235320 A 6/2018
(Continued)

OTHER PUBLICATIONS

3GPP TS 23.501 V16.0.2 (Apr. 2019);3rd Generation Partnership Project;Technical Specification Group Services and System Aspects-;System Architecture for the 5G System;Stage 2(Release 16);total 317 pages.
(Continued)

*Primary Examiner* — Madhuri R Herzog
(74) *Attorney, Agent, or Firm* — Leydig, Voit & Mayer, Ltd.

(57) ABSTRACT

This application provides an unmanned aerial vehicle authentication method and an apparatus. The method includes: sending, by a communications device after determining that a type of a terminal is a UAV, authentication information of the terminal to an authentication server, so that the authentication server can perform authentication on the terminal based on the authentication information of the terminal, and therefore, the authentication server completes authentication on the terminal. In addition, the unmanned aerial vehicle is allowed to fly only after authentication on the terminal succeeds. Therefore, flight security of the unmanned aerial vehicle can be improved.

20 Claims, 9 Drawing Sheets

(56) References Cited

U.S. PATENT DOCUMENTS

| | | | |
|---|---|---|---|
| 2007/0283412 A1* | 12/2007 | Lie | H04W 12/08 726/1 |
| 2011/0116382 A1* | 5/2011 | McCann | H04L 63/1408 370/241 |
| 2012/0094627 A1* | 4/2012 | Suh | H04W 60/04 455/404.1 |
| 2012/0282915 A1* | 11/2012 | Haynes | H04M 17/02 455/422.1 |
| 2015/0336668 A1* | 11/2015 | Pasko | B64C 39/024 701/2 |
| 2017/0045884 A1 | 2/2017 | Kablaoui | |
| 2017/0308085 A1 | 10/2017 | Hall | |
| 2018/0096609 A1* | 4/2018 | de la Cruz | G08G 5/0043 |
| 2018/0375568 A1* | 12/2018 | De Rosa | H04W 72/04 |
| 2019/0068382 A1* | 2/2019 | Theodore | H04L 9/321 |
| 2019/0364507 A1* | 11/2019 | De Rosa | B64C 39/024 |
| 2020/0205211 A1* | 6/2020 | Hong | H04W 76/11 |
| 2020/0301450 A1* | 9/2020 | Li | H04W 4/08 |

FOREIGN PATENT DOCUMENTS

| | | |
|---|---|---|
| CN | 109548411 A | 3/2019 |
| WO | 2019047066 A1 | 3/2019 |

OTHER PUBLICATIONS

3GPP TS 23.502 V16.0.2 (Apr. 2019);3rd Generation Partnership Project;Technical Specification Group Services and System Aspects;Procedures for the 5G System;Stage 2(Release 16);total 419 pages.

* cited by examiner

METHOD AND APPARATUS FOR UNMANNED AERIAL VEHICLE AUTHENTICATION

TECHNICAL FIELD

This application relates to the field of communications technologies, and in particular, to an unmanned aerial vehicle authentication method and an apparatus.

BACKGROUND

An unmanned aerial vehicle (UAV) connected to a network usually needs to be authenticated before it can fly lawfully. Currently, authentication on the unmanned aerial vehicle generally includes first authentication and secondary authentication. The first authentication may be completed in a process in which the unmanned aerial vehicle is registered with a network. However, for implementation of the secondary authentication, there is no related solution currently.

SUMMARY

This application provides an unmanned aerial vehicle authentication method and an apparatus, to implement secondary authentication on an unmanned aerial vehicle before the unmanned aerial vehicle flies, so as to improve flight security of the unmanned aerial vehicle.

According to a first aspect, this application provides an unmanned aerial vehicle authentication method, including: sending, by a communications device, authentication information of a terminal to an authentication server if the communications device determines that a type of the terminal is a UAV, where the authentication information is used by the authentication server to perform authentication.

Based on this solution, after determining that the type of the terminal is the UAV, the communications device sends the authentication information of the terminal to the authentication server, so that the authentication server can perform authentication on the terminal based on the authentication information of the terminal, and therefore, the authentication server completes authentication on the terminal. In addition, the unmanned aerial vehicle is allowed to fly only after authentication on the terminal succeeds. Therefore, flight security of the unmanned aerial vehicle can be improved.

It should be noted that, for example, the authentication server herein may be a data network authentication, authorization, and accounting (DN-AAA) server, or may be a packet data network authentication, authorization, and accounting (PDN-AAA) server. In one embodiment, the authentication server herein may be a supervise server (e.g. servers deployed by the regulator or unmanned aerial vehicle (UAV) supervise servers deployed in the cloud), or third-party business server (such as servers of UAV manufacturers) (such as Dajiang servers), or operator's server (such as Jingdong Logistics Server).

In a possible implementation method, the communications device triggers, based on first policy information, the communications device to determine the type of the terminal, and the first policy information is pre-configured on the communications device or is sent by a policy control function (PCF) network element to the communications device.

Then, in any one of the following three methods, the terminal may determine the type of the terminal, and determine that the type of the terminal is the UAV.

Method 1: The communications device determines, based on subscription information of the terminal that is received from a data management network element, that the type of the terminal is the UAV.

In other words, the communications device may obtain the subscription information of the terminal from the data management network element, then determine the type of the terminal based on the subscription information of the terminal, and determine that the type of the terminal is the UAV.

For example, the data management network element herein may be a unified data management (UDM) network element or a home subscriber server (HSS).

Method 2: The communications device determines, based on indication information received from a data analytics network element, that the type of the terminal is the UAV, where the indication information is used to indicate that the type of the terminal is the UAV.

For example, the data analytics network element herein may be a network data analytics function (NWDAF) network element or a newly added function network element.

Method 3: The communications device determines, based on the type of the terminal that is reported by the terminal, that the type of the terminal is the UAV.

In other words, the terminal may actively report its type to the communications device, and the type of the terminal is the UAV.

In a possible implementation method, after the communications device determines that the type of the terminal is the UAV, and before the communications device sends the authentication information of the terminal to the authentication server, the method further includes: sending, by the communications device to the terminal based on second policy information, a request for obtaining the authentication information, where the second policy information is pre-configured on the communications device, or is from the authentication server or from the PCF network element.

In a possible implementation method, the communications device may further obtain network assistance information, and the network assistance information includes location information of the terminal and/or network capacity information that are/is provided by a network. The sending, by a communications device, authentication information of a terminal to an authentication server includes: sending, by the communications device, the authentication information of the terminal and the network assistance information to the authentication server.

In a possible implementation method, the sending, by the communications device, the authentication information of the terminal and the network assistance information to the authentication server includes: adding, by the communications device, the network assistance information to a container in which the authentication information of the terminal is located, and sending the container to the authentication server; or sending, by the communications device, a first container and a second container to the authentication server, where the first container includes the authentication information of the terminal, and the second container includes the network assistance information.

In a possible implementation method, before the sending, by a communications device, authentication information of a terminal to an authentication server, the method further includes: obtaining, by the communications device, the authentication information of the terminal from the terminal, where the authentication information includes an identifier of the terminal, location information provided by the terminal, or possible flight path information of the terminal.

In specific implementation, the foregoing unmanned aerial vehicle authentication method (namely, a method for performing secondary authentication on an unmanned aerial vehicle) may be applied to any one of the following three application scenarios.

Application scenario 1: After the terminal is registered with the network (first authentication is completed in a process of registering the terminal with the network), secondary authentication on the terminal is implemented.

In this application scenario, for example, the communications device may be an access and mobility management function (AMF) network element or a mobility management entity (MME).

In a possible implementation method, before the communications device determines that the type of the terminal is the UAV, the method further includes: registering, by the communications device, the terminal with the network. After the sending, by a communications device, authentication information of a terminal to an authentication server, the method further includes: receiving, by the communications device, response information from the authentication server, where the response information is used to indicate that authentication on the terminal fails; and initiating, by the communications device, a deregistration procedure of the terminal, or sending, by the communications device, notification information to an unmanned aerial vehicle supervision cloud server, where the notification information is used to indicate that authentication on the terminal fails.

Application scenario 2: In a process in which the terminal is registered with the network, first authentication and secondary authentication on the terminal are completed.

In this application scenario, for example, the communications device may be an AMF network element or an MME.

In a possible implementation method, before the communications device determines that the type of the terminal is the UAV, the method further includes: receiving, by the communications device, a registration request message from the terminal, where the registration request message is used to request to register the terminal with the network, the registration request message includes the authentication information of the terminal, and the authentication information includes an identifier of the terminal, location information provided by the terminal, or possible flight path information of the terminal.

In a possible implementation method, after the sending, by a communications device, authentication information of a terminal to an authentication server, the method further includes: receiving, by the communications device, response information from the authentication server, where the response information is used to indicate that authentication on the terminal fails; and sending, by the communications device, a registration reject message to the terminal, or sending, by the communications device, notification information to an unmanned aerial vehicle supervision cloud server, where the notification information is used to indicate that authentication on the terminal fails.

Application scenario 3: After the terminal is registered with the network (first authentication is completed in a process of registering the terminal with the network), in a session establishment procedure of the terminal, secondary authentication on the terminal is completed.

In this application scenario, for example, the communications device may be an MME or a session management function (SMF) network element.

In a possible implementation method, that the communications device determines that the type of the terminal is the UAV includes: determining, by the communications device in the session establishment procedure of the terminal, that the type of the terminal is the UAV.

In a possible implementation method, after the sending, by a communications device, authentication information of a terminal to an authentication server, the method further includes: receiving, by the communications device, response information from the authentication server, where the response information is used to indicate that authentication on the terminal fails; and sending, by the communications device, a session establishment reject message to the terminal, or sending, by the communications device, notification information to an unmanned aerial vehicle supervision cloud server, where the notification information is used to indicate that authentication on the terminal fails.

In a possible implementation method, before the sending, by a communications device, authentication information of a terminal to an authentication server, the method further includes: selecting, by the communications device, a user plane function (UPF) network element; and establishing, by the communications device, a first interface between the communications device and the UPF network element, and establishing a second interface between the UPF network element and the authentication server. The sending, by a communications device, authentication information of a terminal to an authentication server includes: sending, by the communications device, the authentication information of the terminal to the authentication server by using the first interface and the second interface.

According to a second aspect, this application provides an unmanned aerial vehicle authentication method, including: sending, by a terminal, a registration request message to a communications device, where a type of the terminal is a UAV, the registration request message is used to request to register the terminal with a network, and the registration request message includes authentication information of the terminal; and receiving, by the terminal, a registration reject message from the communications device after authentication on the terminal fails, or receiving, by the terminal, a registration accept message from the communications device after authentication on the terminal succeeds.

Based on this solution, in a procedure in which the terminal is registered with the network, the terminal adds its type to the registration request message, so that a network side may perform, after determining that the type of the terminal is the UAV, authentication on the terminal, and the communications device sends the registration reject message to the terminal after authentication on the terminal fails, or the communications device sends the registration accept message to the terminal after authentication on the terminal succeeds, so as to complete authentication on the terminal. In addition, the unmanned aerial vehicle is allowed to fly only after authentication on the terminal succeeds. Therefore, flight security of the unmanned aerial vehicle can be improved.

In a possible implementation method, the authentication information includes an identifier of the terminal, location information provided by the terminal, or possible flight path information of the terminal.

In a possible implementation method, the communications device is an AMF network element or an MME.

According to a third aspect, this application provides an unmanned aerial vehicle authentication method, including: sending, by a terminal, a session establishment request message to a communications device, where a type of the terminal is a UAV; and receiving, by the terminal, a session establishment reject message from the communications device after authentication on the terminal fails, or receiving, by the terminal, a session establishment complete message from the communications device after authentication on the terminal succeeds.

Based on this solution, in a session establishment procedure, the terminal adds its type to the session establishment request message, so that a network side may perform, after determining that the type of the terminal is the UAV, authentication on the terminal, and the communications device sends the session establishment reject message to the terminal after authentication on the terminal fails, or the communications device sends the session establishment complete message to the terminal after authentication on the terminal succeeds, so as to complete authentication on the terminal. In addition, the unmanned aerial vehicle is allowed to fly only after authentication on the terminal succeeds. Therefore, flight security of the unmanned aerial vehicle can be improved.

In a possible implementation method, the terminal may further send authentication information of the terminal to the communications device based on a request of the communications device, and the authentication information is used by the communications device to perform authentication on the terminal.

In a possible implementation method, the authentication information includes an identifier of the terminal, location information provided by the terminal, or possible flight path information of the terminal.

In a possible implementation method, the communications device is an AMF network element or an MME.

According to a fourth aspect, this application provides an unmanned aerial vehicle authentication method, including: receiving, by an authentication server, authentication information of a terminal from a communications device; and performing, by the authentication server, authentication on the terminal based on the authentication information of the terminal.

Based on this solution, the authentication server receives the authentication information of the terminal from the communications device, and performs authentication on the terminal based on the authentication information of the terminal, so that the authentication server completes authentication on the terminal. In addition, an unmanned aerial vehicle is allowed to fly only after authentication on the terminal succeeds. Therefore, flight security of the unmanned aerial vehicle can be improved.

In a possible implementation method, the authentication server may further receive network assistance information of the terminal from the communications device, and the network assistance information includes location information of the terminal and/or network capacity information that are/is provided by a network. The performing, by the authentication server, authentication on the terminal based on the authentication information of the terminal includes: performing, by the authentication server, authentication on the terminal based on the authentication information of the terminal and the network assistance information.

In a possible implementation method, the performing, by the authentication server, authentication on the terminal based on the authentication information of the terminal and the network assistance information includes: performing, by the authentication server, authentication on the terminal based on the authentication information of the terminal, the network assistance information, and electronic fence information, where the electronic fence information is pre-configured or is from an unmanned aerial vehicle supervision cloud server.

In a possible implementation method, if the authentication server fails to authenticate the terminal, the authentication server sends response information to the communications device, and the response information is used to indicate that authentication on the terminal fails.

In a possible implementation method, the authentication information includes an identifier of the terminal, location information provided by the terminal, or possible flight path information of the terminal.

In a possible implementation method, the communications device is an AMF network element, an MME, or an SMF network element.

According to a fifth aspect, this application provides an apparatus, and the apparatus may be an AMF network element, an MME, an SMF network element, a terminal, or an authentication server, or may be a chip. The apparatus has a function of implementing the unmanned aerial vehicle authentication method in any one of the foregoing aspects or any implementation of any one of the foregoing aspects. The function may be implemented by hardware or may be implemented by hardware by executing corresponding software. The hardware or the software includes one or more modules corresponding to the foregoing function.

According to a sixth aspect, an apparatus is provided, including a processor and a memory. The memory is configured to store a computer execution instruction. When the apparatus runs, the processor executes the computer execution instruction stored in the memory, so that the apparatus performs the unmanned aerial vehicle authentication method in any one of the foregoing aspects or any implementation of any one of the foregoing aspects.

According to a seventh aspect, this application further provides a computer readable storage medium, where the computer readable storage medium stores an instruction, and when the instruction runs on a computer, the computer performs the unmanned aerial vehicle authentication method in any one of the foregoing aspects or any implementation of any one of the foregoing aspects.

According to an eighth aspect, this application further provides a computer program product that includes an instruction, and when the computer program product runs on a computer, the computer performs the unmanned aerial vehicle authentication method in any one of the foregoing aspects or any implementation of any one of the foregoing aspects.

According to a ninth aspect, this application further provides a system, and the system includes the communications device in any one of the first aspect or the implementations of the first aspect, and the authentication server in any one of the fourth aspect or the implementations of the fourth aspect.

In a possible implementation method, the system further includes the terminal in any one of the second aspect or the implementations of the second aspect.

In another possible implementation method, the system further includes the terminal in any one of the third aspect or the implementations of the third aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In description of this application, unless otherwise stated, "a plurality of" means "two or more".

Figure 1:
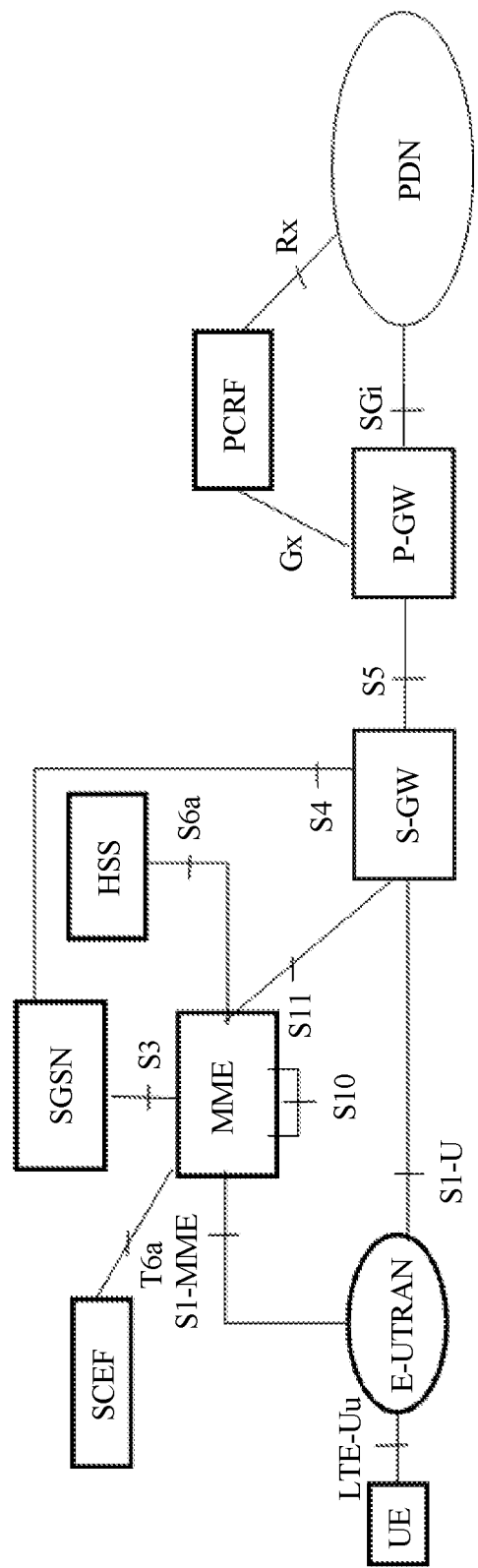
FIG. 1 shows a 3GPP architecture in 4G.

FIG. 1 shows a 3rd Generation Partnership Project (3GPP) architecture in current 4th generation (4G).

The following separately provides brief description of network elements included in the architecture and a function of each network element.

An evolved universal terrestrial radio access network (E-UTRAN) includes a plurality of evolved NodeBs (eNodeB). The eNodeBs are interconnected by using an X2 interface. The eNodeB interacts with an evolved packet core (EPC) network by using an S1 interface. The eNodeB is connected to user equipment (UE) by using a Long Term Evolution (LTE)-Uu interface.

A main function of an MME is to support non-access stratum (NAS) signaling and security of the non-access stratum signaling, tracking area (TA) list management, selection of a packet data network gateway (P-GW) and a serving gateway (S-GW), selection of an MME during cross-MME handover, selection of a serving general packet radio service (GPRS) support node (SGSN) in a process of handover to a 2nd generation (2G)/3rd generation (3G) access system, user authentication, roaming control and bearer management, and mobility management between core network nodes of different 3GPP access networks.

An S-GW is a gateway that terminates on an E-UTRAN interface. Main functions of the S-GW include: serving as a local anchor during inter-base station handover and assisting in completing a base station reordering function; serving as a mobility anchor during handover between different 3GPP access systems; performing a lawful interception function; performing data packet routing and forwarding; performing packet marking at uplink and downlink transport layers; being used for charging between operators; and the like.

A P-GW is a gateway that is oriented to a packet data network (PDN) and that terminates on an SGi interface. If UE accesses a plurality of PDNs, the UE is corresponding to one or more P-GWs. Main functions of the P-GW include: a user-based packet filtering function, a lawful interception function, a UE Internet Protocol (IP) address allocation function, performing data packet transport-level marking in an uplink, performing uplink and downlink service class charging and service level threshold control, performing service-based uplink and downlink rate control, and the like.

An HSS is a database used to store subscription information of a subscriber, and a home network may include one or more HSSs. The HSS is responsible for storing subscriber-related information, such as a subscriber identifier, number and routing information, security information, location information, and profile information.

A serving GPRS support node (SGSN) may be configured to perform signaling interaction during handover between a 2G/3G access network and an E-UTRAN 3GPP access network, including selecting a P-GW and an S-GW, and selecting an MME for a user who is handed over to the E-UTRAN 3GPP access network.

A policy and charging rules function (PCRF) entity terminates on an Rx interface and a Gx interface. In a non-roaming scenario, there is only one PCRF related to one IP-connectivity access network (IP-CAN) session of UE in a home public land mobile network (HPLMN). In a roaming scenario, when local breakout is performed on a service flow, there may be two PCRFs related to an IP-CAN session of one UE.

A service capability exposure function (SCEF) entity mainly supports secure interaction between a 3GPP network and a third-party application. An SCEF entity can securely expose a network capability and an event to a third party, to enhance or improve application service quality.

An interface between a base station and the S-GW is referred to as an S1-U interface. An interface between the base station and the MME is referred to as an S1-MME interface. An interface between the MME and an SCEF network element is referred to as a T6a interface. An interface between the MME and an SGSN network element is referred to as an S3 interface. An interface between the MME and the HSS is referred to as an S6a interface. An interface between MMES is referred to as an S10 interface. An interface between the S-GW and the SGSN network element is referred to as an S4 interface. An interface between the S-GW and the P-GW is referred to as an S5 interface. An interface between the P-GW and a PCRF network element is referred to as a Gx interface. An interface between the P-GW and the PDN is referred to as an SGi interface. An interface between the PDN and the PCRF network element is referred to as an Rx interface.

Figure 2:
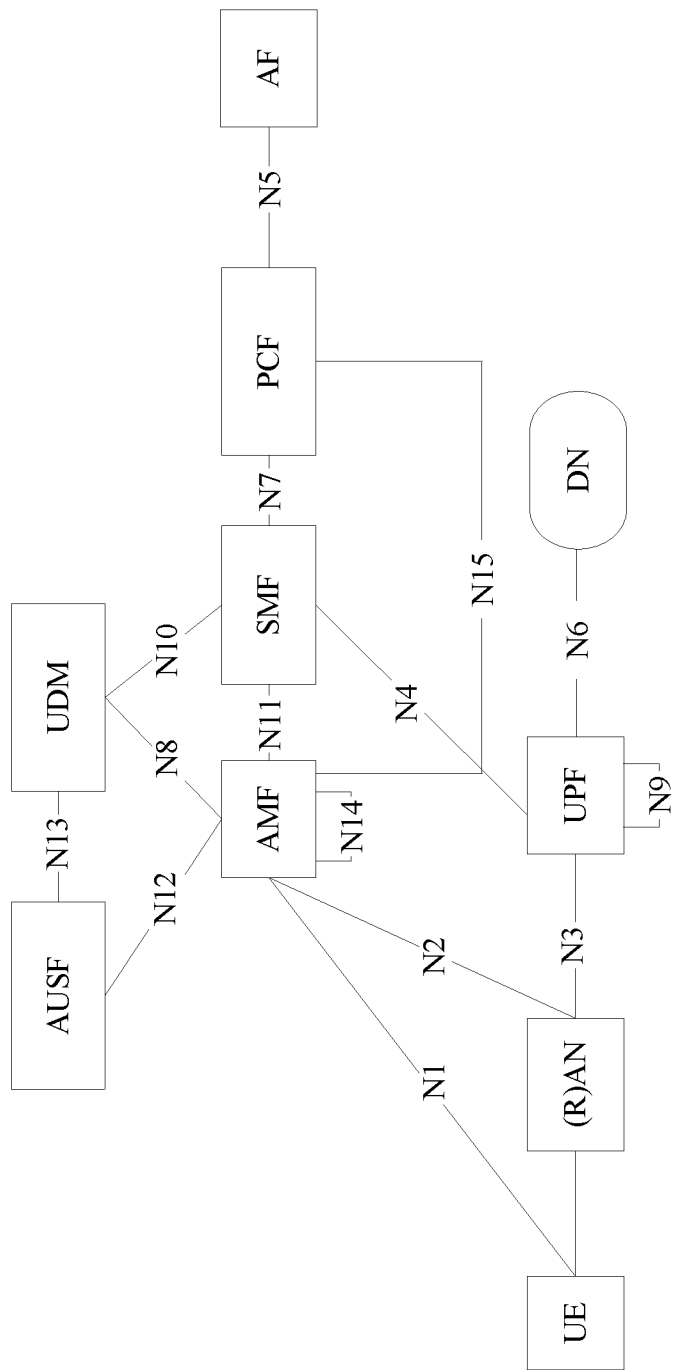
FIG. 2 shows a 3GPP architecture in 5G.

FIG. 2 shows a 3GPP architecture in current 5th generation (5G).

The following separately provides brief description of network elements included in the architecture and a function of each network element.

A (radio) access network ((R)AN) device is mainly responsible for functions on a new radio side, for example, radio resource management, quality of service (QoS) management, and data compression and encryption. The (radio) access network device may include various forms of base stations, such as a macro base station, a micro base station (also referred to as a small cell), a relay station, an access point, and a gNB.

An AMF network element belongs to a core network element, and is mainly responsible for signaling processing, for example, functions such as access control, mobility management, attachment and detachment, and gateway selection. In a case in which the AMF network element provides a service for a session in a terminal, the AMF network element provides a control plane storage resource for the session, to store a session identifier, an SMF network element identifier associated with the session identifier, and the like.

An SMF network element is responsible for user plane network element selection, user plane network element redirection, IP address allocation, bearer establishment, modification and release, and QoS control.

A UPF network element is responsible for forwarding and receiving of user data in a terminal. The UPF network element may receive the user data from a data network, and transmit the user data to the terminal by using an access network device. Alternatively, the UPF network element may receive the user data from the terminal by using an access network device, and forward the user data to a data network. A transmission resource and a scheduling function in the UPF network element that provide a service for the terminal are managed and controlled by the SMF network element.

A PCF network element mainly supports providing of a unified policy framework to control network behavior, and providing of a policy rule for a control layer network function, and is responsible for obtaining policy-related subscription information of a subscriber.

An authentication server function (AUSF) network element mainly provides an authentication function, and supports authentication of 3GPP access and non-3GPP access.

A network exposure function (NEF) network element mainly supports secure interaction between a 3GPP network and a third-party application. The NEF can securely expose a network capability and an event to a third party, to enhance or improve application service quality. The 3GPP network may also securely obtain related data from the third party, to enhance intelligent decision of the network. In addition, the network element supports restoration of structured data from a unified database or storage of structured data in a unified database.

A UDM network element is mainly responsible for storing structured data. Stored content includes subscription data and policy data, externally exposed structured data, and application-related data.

An application function (AF) network element mainly supports interaction with a 3GPP core network to provide a service, for example, affecting a data routing decision, providing a policy control function, or providing some third-party services for a network side.

An interface between UE and the AMF network element is referred to as an N1 interface. An interface between the AMF network element and the RAN device is referred to as an N2 interface. An interface between the RAN device and the UPF network element may be referred to as an N3 interface. An interface between the SMF network element and the UPF network element is referred to as an N4 interface. An interface between the PCF network element and the AF network element is referred to as an N5 interface. An interface between the UPF network element and a DN is referred to as an N6 interface. An interface between the SMF network element and the PCF network element is referred to as an N7 interface. An interface between the AMF network element and the UDM network element is referred to as an N8 interface. An interface between different UPF network elements is referred to as an N9 interface. An interface between the UDM network element and the SMF network element is referred to as an N10 interface. An interface between the AMF network element and the SMF network element is referred to as an N11 interface. An interface between the AUSF network element and the AMF network element is referred to as an N12 interface. An interface between the AUSF network element and the UDM network element is referred to as an N13 interface. An interface between different AMF network elements is referred to as an N14 interface. An interface between the AMF network element and the PCF network element is referred to as an N15 interface.

Based on the architecture shown in FIG. 1 or FIG. 2, this application describes an unmanned aerial vehicle authentication method provided in this application.

Before the method in this application is described, an authentication procedure that needs to be completed before an unmanned aerial vehicle lawfully flies is first described briefly.

Currently, four types of authentication mainly need to be performed before an unmanned aerial vehicle connected to a network lawfully flies.

(1) Cellular Network Access Authentication

The cellular network access authentication is authentication completed in a process in which the unmanned aerial vehicle is registered with a network, and the cellular network access authentication may also be referred to as first authentication. The cellular network access authentication means that when the terminal device establishes a NAS signaling connection with the network, the cellular network needs to identify and authenticate the terminal; and at the same time, authorizes the service enjoyed by the terminal device according to the subscription information of the terminal device. The registration process is one of the scenarios that requires authentication, and which is not limited to this. Others such as the service request (SR) session establishment procedure may also require authentication.

The cellular network access authentication means that when a terminal establishes an NAS signaling connection to the network, the cellular network needs to identify and authenticate the terminal, and perform, based on subscription information of the terminal, authorization on a service enjoyed by the terminal. The registration procedure is only one scenario in which authentication is required, and this is not limited. In another procedure such as an SR procedure or a session establishment procedure, authentication may also be required.

(2) Identity Authentication

The identity authentication is authentication for which a supervision department is responsible or unmanned aerial vehicle supervision cloud (for example, unmanned aerial vehicle traffic management (UTM)) is responsible, and is used to perform authentication on a lawful identity of the unmanned aerial vehicle.

(3) Flight Plan Authentication

The flight plan authentication is authentication for which an unmanned aerial vehicle supervision cloud server and a supervision department are jointly responsible, and is used to perform authentication on a flight plan of the unmanned aerial vehicle. The authentication may be usually applied for offline. For example, application for executing a flight mission in specific airspace is performed offline.

(4) Take-Off Authorization (Authentication)

The take-off authorization is authentication for which an unmanned aerial vehicle supervision cloud server is responsible, and is responsible for checking whether a take-off location of the unmanned aerial vehicle is lawful.

Some or all types of the foregoing authentication (2), (3), and (4) may be referred to as secondary authentication, to be specific, the secondary authentication is in relative to the first authentication. For example, the secondary authentication may include only the identity authentication, may include only the flight plan authentication, may include only the take-off authorization, may include the identity authentication and the flight plan authentication, may include the flight plan authentication and the take-off authorization, may include the take-off authorization and the identity authentication, or may include the identity authentication, the flight plan authentication, and the take-off authorization.

The unmanned aerial vehicle authentication method in this application is for the secondary authentication in the foregoing authentication process. The following describes the unmanned aerial vehicle authentication method provided in this application with reference to FIG. 1 and FIG. 2.

A terminal in the method in this application may be UE in the 4G architecture shown in FIG. 1, or may be UE in the 5G architecture shown in FIG. 2. Further, the terminal in this application is specifically an unmanned aerial vehicle.

It should be noted that, if the method in this application is applied to the 4G architecture shown in FIG. 1, a communications device in the method in this application may be an MME, a data management network element may be an HSS, an authentication server may be a PDN-AAA server (not shown in the figure), a data analytics network element may be a newly added function network element, and a location management network element may be an evolved serving mobile location center (E-SMLC) network element.

If the method in this application is applied to the 5G architecture shown in FIG. 2, a communications device in the method in this application may be an AMF network element or an SMF network element, a data management network element may be a UDM network element, an authentication server may be a DN-AAA server (not shown in the figure), a data analytics network element may be an NWDAF network element, and a location management network element may be a location management function (LMF) network element.

Figure 3:
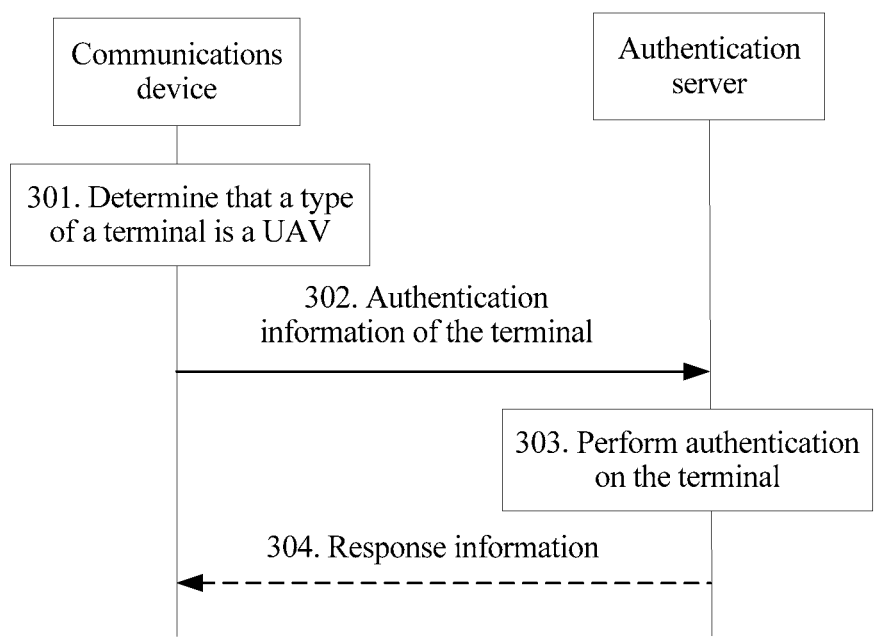
FIG. 3 is a flowchart of an unmanned aerial vehicle authentication method according to this application.

FIG. 3 shows an unmanned aerial vehicle authentication method according to this application. The method includes the following steps.

Step 301: A communications device determines that a type of a terminal is a UAV.

For example, the communications device may determine, in the following methods, that the type of the terminal is the UAV.

Method 1: The communications device determines, based on subscription information of the terminal that is received from a data management network element, that the type of the terminal is the UAV.

In other words, the communications device may obtain the subscription information of the terminal from the data management network element, then determine the type of the terminal based on the subscription information of the terminal, and determine that the type of the terminal is the UAV.

Method 2: The communications device determines, based on indication information received from a data analytics network element, that the type of the terminal is the UAV, where the indication information is used to indicate that the type of the terminal is the UAV, so that the communications device can determine that the type of the terminal is the UAV.

Method 3: The communications device determines, based on the type of the terminal that is reported by the terminal, that the type of the terminal is the UAV.

In other words, the terminal may actively report its type to the communications device, and the type of the terminal is the UAV, so that the communications device can determine that the type of the terminal is the UAV.

In an implementation method, the communications device may be triggered, in the following method, to determine the type of the terminal: The communications device triggers, based on first policy information, the communications device to determine the type of the terminal. The first policy information is pre-configured on the communications device or is sent by a PCF network element to the communications device. For example, before step 301, the PCF sends the first policy information to the communications device, to trigger the communications device to determine the type of the terminal. For another example, before step 301, based on the pre-configured first policy information and content in the first policy information, the communications device may determine that the type of the terminal needs to be determined currently, and perform an action of determining the type of the terminal.

Step 302: The communications device sends authentication information of the terminal to an authentication server, where the authentication information is used by the authentication server to perform authentication.

Step 303: The authentication server performs authentication on the terminal based on the authentication information of the terminal.

The authentication herein is the foregoing secondary authentication, and details are not described again subsequently.

Based on this solution, after determining that the type of the terminal is the UAV, the communications device sends the authentication information of the terminal to the authentication server, so that the authentication server can perform authentication on the terminal based on the authentication information of the terminal, and therefore, the authentication server completes authentication on the terminal. In addition, the unmanned aerial vehicle is allowed to fly only after authentication on the terminal succeeds. Therefore, flight security of the unmanned aerial vehicle can be improved.

In a possible implementation method, before step 302, the communications device may send, to the terminal based on second policy information that is received from the PCF network element or the authentication server or is pre-configured, a request for obtaining the authentication information, so that the terminal sends the authentication information to the communications device. The second policy information is used to instruct the communications device to obtain the authentication information required for authentication.

It should be noted that, in specific implementation, in one embodiment, the first policy information and the second policy information in this application may be collectively referred to as policy information, and the policy information is from the PCF or from the authentication server, or is pre-configured. In other words, the policy information has both content of the first policy information and content of the second policy information.

In a possible implementation method, after step 301, and before step 302, if the communications device determines that the authentication information of the terminal is not stored locally, the communications device obtains the authentication information of the terminal from the terminal.

The authentication information includes one or more of the following information: an identifier (for example, a sequence number, a flight control number or a control party certificate number, an international mobile subscriber identity (IMSI), an international mobile equipment identity (IMEI), a mobile subscriber integrated services digital network (ISDN) number (MSISDN), or a generic public subscription identifier (GPSI)) of the terminal, location information provided by the terminal, or possible flight path information of the terminal.

In a possible implementation method, after step 301, the communications device may further obtain network assistance information. The network assistance information includes location information (such as a tracking area identity (TAI), a cell identifier (Cell ID), a local IP address of UE, or a User Datagram Protocol (UDP) source port number) of the terminal and/or network capacity information that are/is provided by a network. For example, herein, the location information of the terminal that is provided by the network may be obtained by a location management network element and provided by the location management network element for the communications device. For example, the location management network element obtains the location information (for example, a positioning result obtained in a (NI-LR) positioning procedure) of the terminal by initiating a positioning procedure. The network capacity information herein is information (for example, terminal quantity information or communications network element load information) related to a terminal that exists (for example, on a per-area basis) in the current network and that is served.

Therefore, step 302 may be specifically: The communications device sends the authentication information of the terminal and the network assistance information to the authentication server. In an implementation, the communications device may add the network assistance information to a container in which the authentication information of the terminal is located, and send the container to the authentication server. In another implementation, the communications device may further send a first container and a second container to the authentication server, the first container includes the authentication information of the terminal, and the second container includes the network assistance information.

If the communications device sends the authentication information of the terminal and the network assistance information to the authentication server, step 303 may be specifically: The authentication server performs authentication on the terminal based on the authentication information of the terminal and the network assistance information.

Optionally, if the authentication server further obtains electronic fence information, step 303 may be specifically: The authentication server may further perform authentication on the terminal based on the authentication information of the terminal, the network assistance information, and the electronic fence information. The electronic fence information herein is pre-configured or is from an unmanned aerial vehicle supervision cloud server, a government supervision department, or the like.

In a possible implementation method, after step 303, the method further includes the following step:

Step 304: The authentication server sends response information to the communications device.

If authentication performed by the authentication server on the terminal succeeds (in other words, the authentication passes), the response information is used to indicate that authentication on the terminal succeeds.

If authentication performed by the authentication server on the terminal fails (in other words, the authentication does not pass), the response information is used to indicate that authentication on the terminal fails.

In specific implementation, the method shown in FIG. 3 may be specifically implemented with reference to different application scenarios, which are separately described below.

Implementation method 1: After a terminal is registered with a network, the method shown in FIG. 3 is performed.

Figure 4:
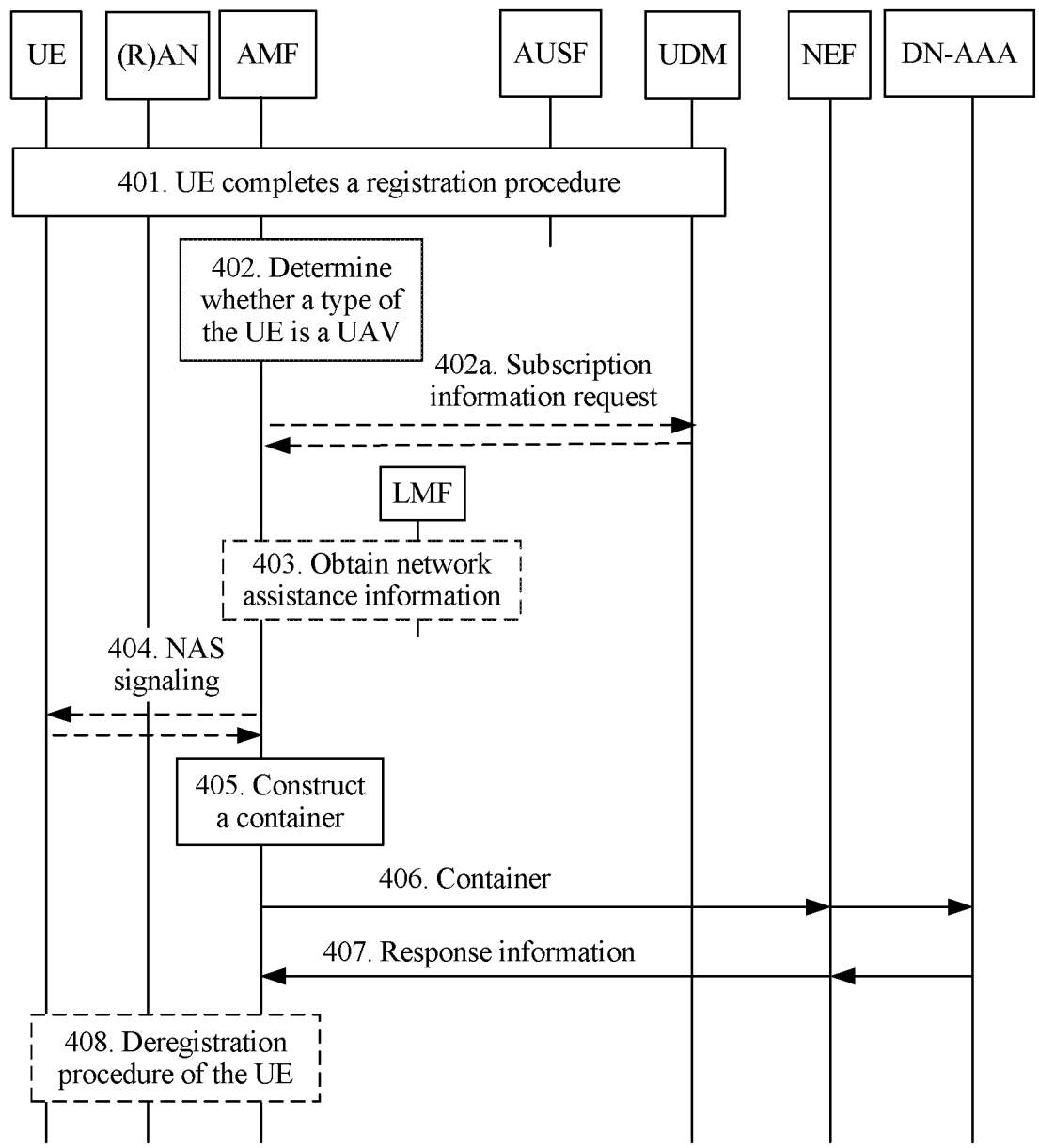
FIG. 4 is a flowchart of another unmanned aerial vehicle authentication method according to this application.

FIG. 4 shows another unmanned aerial vehicle authentication method according to this application. The method is described by using an example in which all network elements in the embodiment shown in FIG. 3 are the network elements in the 5G architecture shown in FIG. 2. Specifically, the communications device, the authentication server, the data management network element, the location management network element, the data analytics network element, and the terminal in the embodiment shown in FIG. 3 are respectively an AMF network element, a DN-AAA server, a UDM network element, an LMF network element, an NWDAF network element, and UE. For ease of description, in this embodiment, the AMF network element, the DN-AAA server, the UDM network element, the LMF network element, and the NWDAF network element are respectively referred to as an AMF, a DN-AAA, a UDM, an LMF, and an NWDAF for short.

The method includes the following steps.

Step 401: The UE completes a registration procedure.

In the procedure in which the UE is registered with a network, cellular network access authentication is completed, in other words, first authentication is completed. In addition, in this procedure, the AMF may identify an address of the DN-AAA based on information that is locally configured, is obtained through capability opening platform, or is carried in a UE request.

Step 402: The AMF determines, based on first policy information, whether a type of the UE is a UAV.

Specifically, the AMF may determine the type of the UE in any one of the three methods described in step 301 in the embodiment shown in FIG. 3.

If Method 1 in the three methods described in step 301 in the embodiment shown in FIG. 3 is used, when the AMF does not store subscription information of the UE, the AMF may obtain the subscription information of the UE by performing the following step 402a.

Step 402a: The AMF sends a subscription information request to the UDM, where the subscription information request carries an AMF ID, a UE ID, and a to-be-queried subscription type, and then the UDM sends the subscription information of the UE to the AMF.

In specific implementation, for example, the subscription information request may be an Nudm SDM Get request.

The AMF ID herein is an identifier of the AMF, the UE ID is an identifier of the UE, and the to-be-queried subscription type is a UAV-related subscription type. In specific implementation, for example, the UE ID may be a subscription permanent identifier (SUPI) or a generic public subscription identifier (GPSI).

If Method 2 in the three methods described in step 301 in the embodiment shown in FIG. 3 is used, the AMF receives indication information from the NWDAF, and the indication information is used to indicate that the type of the UE is the UAV.

If Method 3 in the three methods described in step 301 in the embodiment shown in FIG. 3 is used, the AMF may determine, based on the type of the UE that is reported by the UE, that the type of the UE is the UAV. For example, the type of the UE may be obtained in step 401.

Step 403: The AMF obtains network assistance information.

Step 403 is an optional step. For example, the AMF may determine, based on policy information, whether to obtain the network assistance information. For example, the policy information may be authorization policy information that is locally configured, is delivered by a PCF, or is obtained from the DN-AAA.

The network assistance information herein includes location information of the UE and/or network capacity information that are/is provided by the network. For details, refer to related description in the embodiment in FIG. 3.

It should be noted that, in an implementation, the location information of the UE that is provided by the network may be obtained by the AMF from the AMF, or may be obtained from the LMF (for example, the LMF obtains the location information of the UE by initiating a positioning procedure such as an NI-LR procedure, and sends the location information of the UE to the AMF).

In an implementation, the network capacity information may be obtained by the AMF from the AMF, for example, may be obtained by subscribing to a UE quantity event in an area.

Step 404: The AMF obtains authentication information from the UE by using NAS signaling.

This step is an optional step. If the AMF has obtained the authentication information of the UE before, step 404 may not need to be performed.

For example, the NAS signaling may be NAS MM Transport.

Step 405: The AMF constructs a container.

In an implementation, the authentication information obtained by the AMF from the UE is carried in the container. If the network assistance information needs to be sent to the DN-AAA, the network assistance information may be added to the container.

In another implementation, the authentication information obtained by the AMF from the UE is carried in the container (referred to as a first container). If the network assistance information needs to be sent to the DN-AAA, a second container may be constructed based on the network assistance information, and the second container carries the network assistance information.

Step 406: The AMF sends the constructed container to the DN-AAA.

In an implementation, the AMF sends the container to the DN-AAA, and the container includes the authentication information, or includes the authentication information and the network assistance information.

In another implementation, the AMF sends the first container to the DN-AAA, and the first container includes the authentication information. Alternatively, the AMF sends the first container and the second container to the DN-AAA, and the second container includes the network assistance information.

In an implementation, if an operator does not allow the DN-AAA to directly access a 5G core network, the AMF may send the container to the DN-AAA by using an NEF network element. If an operator allows the DN-AAA to directly access a 5G core network, the AMF may directly send the container to the DN-AAA.

Optionally, the AMF may send an authentication request to the DN-AAA, and the authentication request carries the container, carries the first container, or carries the first container and the second container.

Step 407: The DN-AAA sends response information to the AMF.

The response information is used to indicate that authentication on the UE fails, or is used to indicate that authentication on the UE succeeds.

In an implementation, if an operator does not allow the DN-AAA to directly access a 5G core network, the DN-AAA may send the container to the AMF by using an NEF network element. If an operator allows the DN-AAA to directly access a 5G core network, the DN-AAA may directly send the container to the AMF.

Optionally, the DN-AAA may send an authentication response to the AMF, and the authentication response carries the response information.

Optionally, if the response information indicates that authentication on the UE fails, the following step 408 may be further performed.

Step 408: The AMF initiates a deregistration procedure of the UE.

Optionally, if the response information indicates that authentication on the UE fails, the AMF may further send notification information to an unmanned aerial vehicle supervision cloud server, and the notification information is used to indicate that authentication on the UE fails.

For example, the AMF may directly send the notification information to the unmanned aerial vehicle supervision cloud server, or send the notification information to the unmanned aerial vehicle supervision cloud server by using an NEF network element.

Based on the foregoing implementation method, a trigger occasion of secondary authentication may be any moment after first authentication is completed (the first authentication is completed in the registration procedure of the UE), and the AMF notifies the DN-AAA to perform authentication on the UE. It should be noted that a network element triggering the secondary authentication is not limited to the AMF network element, and may also be another core network element that has a similar function, for example, an NEF network element that has a capability of interacting with the DN-AAA, or may be another newly defined function network element.

In the embodiment shown in FIG. 4, Embodiment 3 is specifically described with reference to the 5G architecture shown in FIG. 2. In another embodiment, FIG. 3 may be specifically described with reference to the 5G architecture shown in FIG. 1. Specifically, the communications device, the authentication server, the data management network element, the location management network element, the data analytics network element, and the terminal in FIG. 3 are respectively an MME, a PDN-AAA, an HSS, an E-SMLC, a newly added network element, and UE, and the SEF network element described in the embodiment in FIG. 4 may be replaced with an SCEF network element. A specific implementation method of this embodiment is similar to that of the embodiment shown in FIG. 4. For details, refer to the embodiment shown in FIG. 4. Details are not described again.

Implementation method 2: In a process in which a terminal is registered with a network, the method shown in FIG. 3 is performed.

Figure 5A:
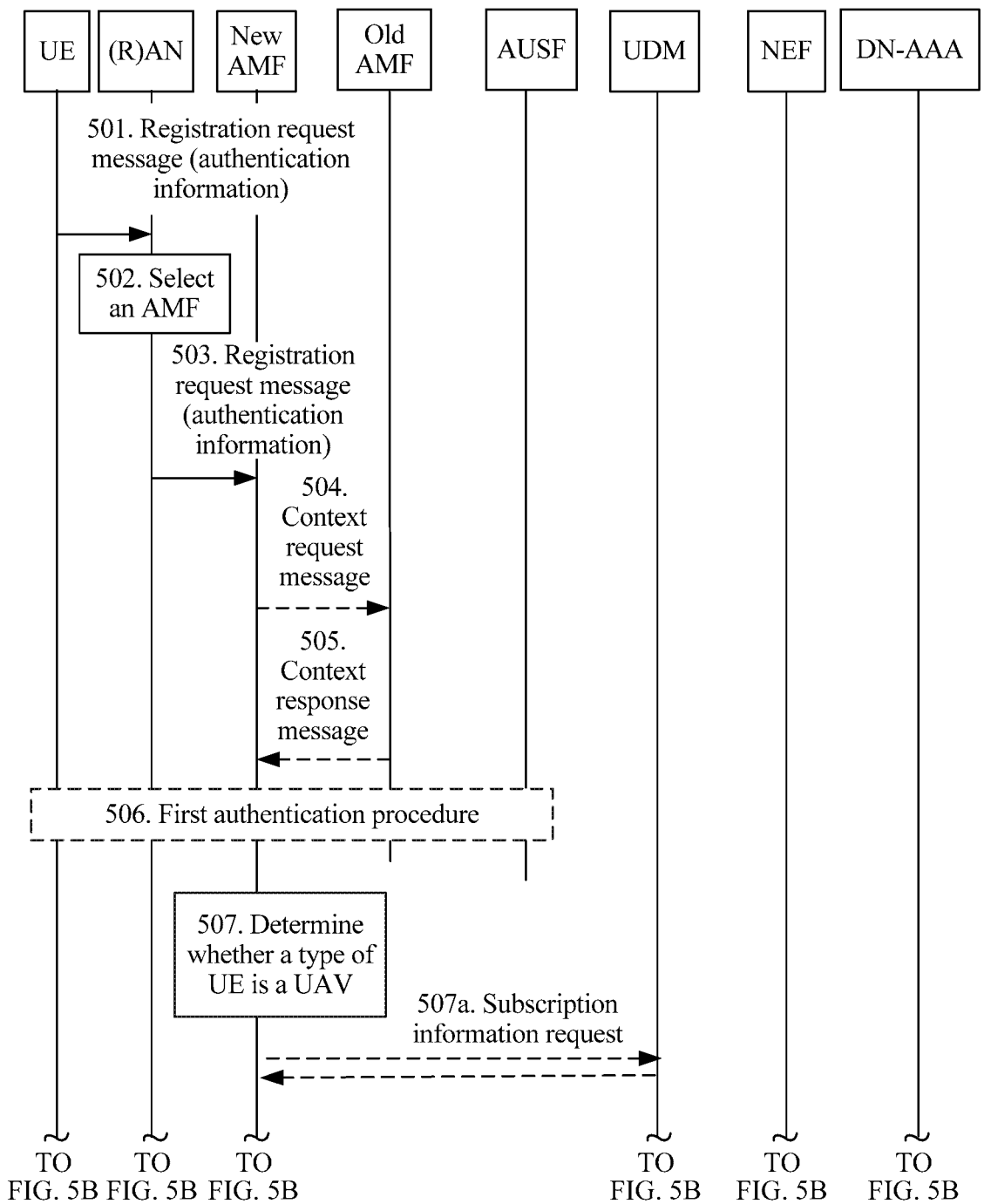
FIG. 5A and FIG. 5B are a flowchart of another unmanned aerial vehicle authentication method according to this application.
Figure 5B:
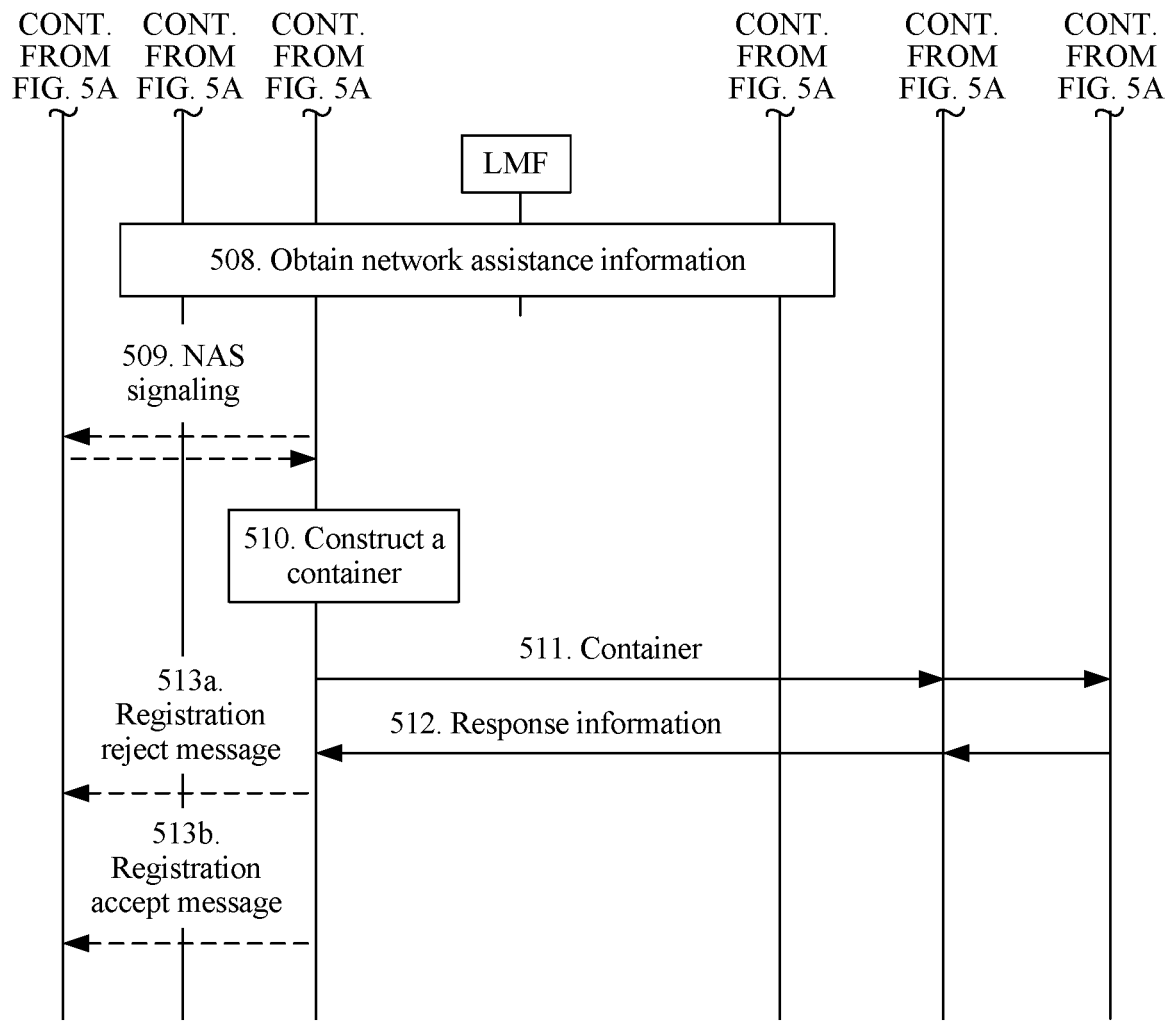

FIG. 5A and FIG. 5B show another unmanned aerial vehicle authentication method according to this application. The method is described by using an example in which all network elements in the embodiment shown in FIG. 3 are the network elements in the 5G architecture shown in FIG. 2. Specifically, the communications device, the authentication server, the data management network element, the location management network element, the data analytics network element, and the terminal in the embodiment shown in FIG. 3 are respectively an AMF, a DN-AAA, a UDM, an LMF, an NWDAF, and UE.

The method includes the following steps.

Step 501: The UE sends a registration request message to an (R)AN device, where the registration request message carries authentication information.

The registration request message is used to request to register the UE with a network.

The authentication information includes at least one of the following information: an identifier of the UE, location information provided by the UE, or possible flight path information of the UE.

Step 502: The (R)AN device selects an AMF.

For example, the AMF selected by the (R)AN device is referred to as a new AMF (New AMF), and correspondingly, an AMF that registers the UE last time is referred to as an old AMF (Old AMF).

Step 503: The (R)AN device sends a registration request message to the new AMF, where the registration request message carries the authentication information.

The authentication information is the authentication information in step 501.

Step 504: The new AMF sends a context request message to an old AMF, to request to obtain context information of the UE.

For example, the context request message may be specifically Namf_Communication_UEContextTransfer.

Step 505: The old AMF sends a context response message to the new AMF, where the response message carries the context information of the UE.

For example, the context response message may be specifically an Namf_Communication_UEContextTransfer response.

Step 504 and step 505 are optional steps.

Step 506: Perform a first authentication procedure of the UE.

The first authentication procedure is also referred to as a cellular network authentication/security procedure. This procedure is the prior art. For details, refer to related description, and details are not described herein.

Step 507 to step 512 are the same as step 402 to step 407 in the embodiment shown in FIG. 4. For details, refer to the foregoing description. An operation performed by the new AMF in FIG. 5A and FIG. 5B is similar to an operation performed by the AMF in FIG. 4.

It should be noted that, step 509 needs to be performed, only when the authentication information sent by the UE in step 501 is incomplete, to continue to obtain the authentication information from the UE.

Optionally, if the response information in step 512 indicates that authentication on the UE fails, the following step 513a may be further performed. If the response information in step 512 indicates that authentication on the UE succeeds, the following step 513b may be further performed.

Step 513a: The new AMF sends a registration reject message to the UE.

The registration reject message is used to indicate that a registration request of the UE is rejected, and registration of the UE fails.

Optionally, if the response information indicates that authentication on the UE fails, the new AMF may further send notification information to an unmanned aerial vehicle supervision cloud server, and the notification information is used to indicate that authentication on the UE fails.

Step 513b: The new AMF sends a registration accept message to the UE.

The registration accept message is used to indicate that a registration request of the UE is accepted, and registration of the UE succeeds.

Based on the foregoing implementation method, a trigger occasion of secondary authentication may be in a process of first authentication, in other words, in the registration procedure of the UE, both the first authentication and the secondary authentication are performed. The new AMF notifies the DN-AAA to perform authentication on the UE. It should be noted that a network element triggering the secondary authentication is not limited to the new AMF network element, and may also be another core network element that has a similar function, for example, an NEF network element that has a capability of interacting with the DN-AAA, or may be another newly defined function network element.

In the embodiment shown in FIG. 5A and FIG. 5B, Embodiment 3 is specifically described with reference to the 5G architecture shown in FIG. 2. In another embodiment, Embodiment 3 may be specifically described with reference to the 5G architecture shown in FIG. 1. Specifically, the communications device, the authentication server, the data management network element, the location management network element, the data analytics network element, and the terminal in FIG. 3 are respectively an MME, a PDN-AAA server, an HSS, an E-SMLC, a newly added network element, and UE, and the SEF network element described in the embodiment in FIG. 5A and FIG. 5B may be replaced with an SCEF network element. A specific implementation method of this embodiment is similar to that of the embodiment shown in FIG. 5A and FIG. 5B. For details, refer to the embodiment shown in FIG. 5A and FIG. 5B. Details are not described again.

Implementation method 3: In a session establishment procedure after a terminal is registered with a network, the method shown in FIG. 3 is performed.

Figure 6A:
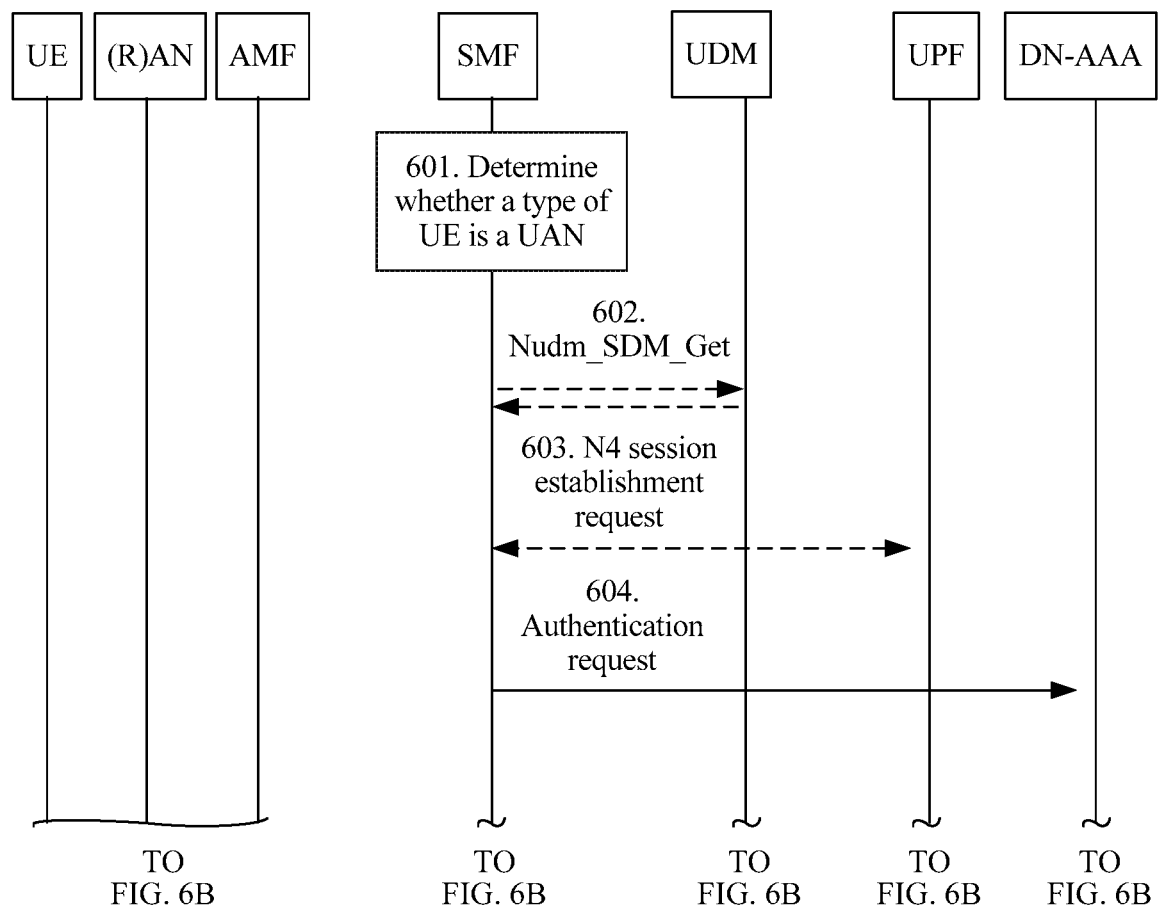
FIG. 6A and FIG. 6B are a flowchart of another unmanned aerial vehicle authentication method according to this application.
Figure 6B:
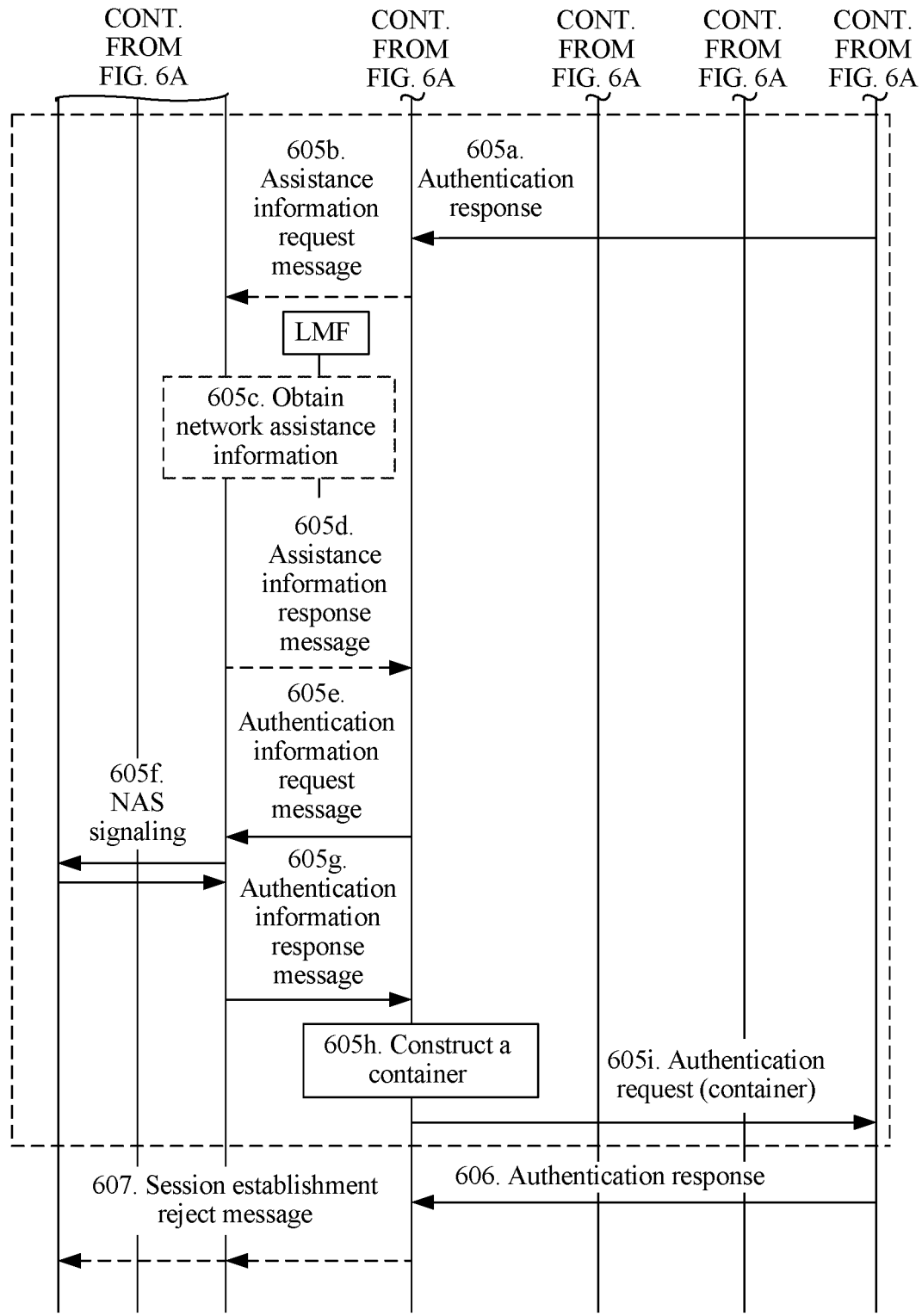

FIG. 6A and FIG. 6B show another unmanned aerial vehicle authentication method according to this application. The method is described by using an example in which all network elements in the embodiment shown in FIG. 3 are the network elements in the 5G architecture shown in FIG. 2. Specifically, the communications device, the authentication server, the data management network element, the location management network element, the data analytics network element, and the terminal in the embodiment shown in FIG. 3 are respectively an SMF, a DN-AAA, a UDM, an LMF, an NWDAF, and UE.

The UE performs a session establishment process, and the SMF may identify an address of the DN-AAA server based on information that is locally configured, is obtained through capability opening, or is carried in a UE request.

The method includes the following steps.

Step 601: The SMF determines, based on first policy information, whether a type of the UE is a UAV.

Specifically, the SMF may determine the type of the UE in any one of the three methods described in step 301 in the embodiment shown in FIG. 3.

If Method 1 in the three methods described in step 301 in the embodiment shown in FIG. 3 is used, when the SMF does not store subscription information of the UE, the SMF may obtain the subscription information of the UE by performing the following step 602a.

Step 602a: The SMF sends a subscription information request to the UDM, where the subscription information request carries an SMF ID, a UE ID, and a to-be-queried subscription type, and then the UDM sends the subscription information of the UE to the SMF.

In specific implementation, for example, the subscription information request may be an Nudm SDM Get request.

The SMF ID herein is an identifier of the SMF, the UE ID is an identifier of the UE, and the to-be-queried subscription type is a UAV-related subscription type. In specific implementation, for example, the UE ID may be an SUPI or a GPSI.

If Method 2 in the three methods described in step 301 in the embodiment shown in FIG. 3 is used, the SMF receives indication information from the NWDAF network element, and the indication information is used to indicate that the type of the UE is the UAV.

If Method 3 in the three methods described in step 301 in the embodiment shown in FIG. 3 is used, the SMF may determine, based on the type of the UE that is reported by the UE, that the type of the UE is the UAV. For example, the type of the UE may be obtained in a registration procedure of the UE.

Step 603: If an N4 session is not established, the SMF performs UPF selection and an N4 session establishment procedure, to establish an N4 interface (also referred to as a first interface) between the SMF and a UPF.

It should be noted that establishment of an N6 interface (also referred to as a second interface) between the UPF and the DN-AAA further needs to be completed subsequently.

Step 604: The SMF sends an authentication request to the DN-AAA.

If the SMF obtains authentication information of the UE in the registration procedure of the UE, the authentication request carries the authentication information of the UE. When authentication performed by the DN-AAA on the UE succeeds, the following step 605a to step 605i are skipped.

If the SMF obtains no authentication information of the UE in the registration procedure of the UE, the authentication request carries no authentication information of the UE. Alternatively, if authentication information of the UE that is obtained by the SMF in the registration procedure of the UE is incomplete, authentication information of the UE that is carried in the authentication request is incomplete. Therefore, the DN-AAA needs to continue to request to obtain the authentication information, and then the following step 605a to step 605i need to be performed.

Step 605a: The DN-AAA sends an authentication response to the SMF, where the authentication response carries second policy information.

The SMF determines, based on the second policy information, that the authentication information needs to be obtained from the UE. The second policy information is used to instruct the SMF to obtain the authentication information required for authentication.

Step 605b: The SMF sends an assistance information request message to an AMF, where the assistance information request message is used to request to obtain network assistance information of the UE.

For example, the assistance information request message may be an Namf_Location_ProvidePositioningInfo request message, or may be an Namf_Location_ProvideLocationInfo request message.

Step 605c: The AMF obtains the network assistance information.

The AMF may determine, based on authorization policy information from the DN-AAA, whether to obtain the network assistance information.

The network assistance information herein includes location information of the UE and/or network capacity information that are/is provided by a network. For details, refer to related description in the embodiment in FIG. 3.

It should be noted that, in an implementation, the location information of the UE that is provided by the network may be obtained by the AMF from the AMF, or may be obtained from the LMF (for example, the LMF obtains the location information of the UE by initiating a positioning procedure such as an NI-LR procedure, and sends the location information of the UE to the AMF).

In an implementation, the network capacity information may be obtained by the AMF from the AMF, for example, may be obtained by subscribing to a UE quantity event in an area.

Step 605d: The AMF sends an assistance information response message to the SMF, where the assistance information response message includes the network assistance information of the UE.

For example, the assistance information response message may be an Namf_Location_ProvidePositioningInfo response message, or may be an Namf_Location_ProvideLocationInfo response message.

Step 605e: The SMF sends an authentication information request message to the AMF, where the authentication information request message is used to request authentication information of the UE.

For example, the authentication information request message may be an Namf_Communication_N1N2MessageTransfer message.

Step 605f: The AMF obtains the authentication information from the UE by using NAS signaling.

This step is an optional step. If the AMF has obtained the authentication information of the UE before, step 605f may not need to be performed.

For example, the NAS signaling may be NAS MM Transport.

Step 605g: The AMF sends an authentication information response message to the SMF, where the authentication information response message includes the authentication information of the UE.

For example, the authentication information response message may be an Nsmf_PDUSession_UpdateSMContext message.

Step 605h: The SMF constructs a container.

In an implementation, the authentication information obtained by the SMF from the AMF is carried in the container. If the network assistance information needs to be sent to the DN-AAA, the network assistance information may be added to the container.

In another implementation, the authentication information obtained by the SMF from the AMF is carried in the container (referred to as a first container). If the network assistance information needs to be sent to the DN-AAA, a second container may be constructed based on the network assistance information, and the second container carries the network assistance information.

Step 605i: The SMF sends an authentication request to the DN-AAA, where the authentication request includes the container.

In an implementation, the authentication request includes the container, and the container includes the authentication information, or includes the authentication information and the network assistance information.

In another implementation, the authentication request includes the first container, and the first container includes the authentication information. Alternatively, the authentication request includes the first container and the second container, and the second container includes the network assistance information.

In an implementation, if an operator does not allow the DN-AAA to directly access a 5G core network, the SMF may send the authentication request to the DN-AAA by using the UPF network element, in other words, send the authentication request to the DN-AAA by using the N4 interface (first interface) between the SMF and the UPF and the N6 interface (second interface) between the UPF and the DN-AAA. If an operator allows the DN-AAA to directly access a 5G core network, the SMF may directly send the authentication request to the DN-AAA.

Step 606: The DN-AAA sends an authentication response to the SMF, where the authentication response includes response information.

The response information is used to indicate that authentication on the UE fails, or is used to indicate that authentication on the UE succeeds.

If an operator does not allow the DN-AAA to directly access a 5G core network, the DN-AAA may send the authentication response to the SMF by using the UPF network element, in other words, send the authentication request to the SMF by using the N6 interface (second interface) between the UPF and the DN-AAA and the N4 interface (first interface) between the SMF and the UPF. If an operator allows the DN-AAA to directly access a 5G core network, the DN-AAA may directly send the authentication request to the SMF.

Optionally, if the response information indicates that authentication on the UE fails, the following step 607 may be further performed.

Step 607: The SMF sends a session establishment reject message to the UE.

For example, the SMF may send the session establishment reject message to the UE by using the AMF, and the session establishment reject message is used to reject session establishment.

Optionally, if the response information indicates that authentication on the UE fails, the SMF may further send notification information to an unmanned aerial vehicle supervision cloud server, and the notification information is used to indicate that authentication on the UE fails.

Optionally, if the response information indicates that authentication on the UE succeeds, the SMF may further complete another procedure of session establishment, so as to complete session establishment.

Based on the foregoing implementation method, a trigger occasion of secondary authentication may be in the session establishment procedure after the registration procedure of the UE is completed, and the SMF notifies the DN-AAA to perform authentication on the UE. It should be noted that a network element triggering the secondary authentication is not limited to the SMF network element, and may also be another core network element that has a similar function, for example, a UPF network element that has a capability of interacting with the DN-AAA, or may be another newly defined function network element.

In the embodiment shown in FIG. 6A and FIG. 6B, Embodiment 3 is specifically described with reference to the 5G architecture shown in FIG. 2. In another embodiment, Embodiment 3 may be specifically described with reference to the 5G architecture shown in FIG. 1. Specifically, the communications device, the authentication server, the data management network element, the location management network element, the data analytics network element, and the terminal in FIG. 3 are respectively an MME, a PDN-AAA server, an HSS, an E-SMLC, a newly added network element, and UE, and the SEF network element described in the embodiment in FIG. 6A and FIG. 6B may be replaced with an SCEF network element. A specific implementation method of this embodiment is similar to that of the embodiment shown in FIG. 6A and FIG. 6B. For details, refer to the embodiment shown in FIG. 6A and FIG. 6B. Details are not described again.

It should be noted that specific implementation of the embodiment in FIG. 3 is not limited to the foregoing three implementation methods, and may also be another implementation method. The foregoing secondary authentication procedure may be performed at any moment after a first authentication procedure is completed.

It can be understood that, to implement the foregoing functions, each network element includes a corresponding hardware structure and/or software module for implementing each function. A person of ordinary skill in the art should easily be aware that, in combination with units and algorithm steps in the examples described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 7:
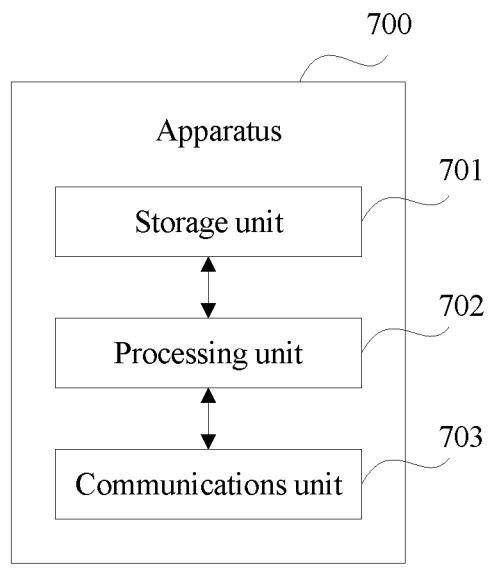
FIG. 7 is a schematic diagram of an apparatus according to this application.

FIG. 7 is a possible example block diagram of an apparatus used in this application, and the apparatus 700 may exist in a form of software or hardware. The apparatus 700 may include a processing unit 702 and a communications unit 703. In an implementation, the communications unit 703 may include a receiving unit and a sending unit. The processing unit 702 is configured to control and manage an action of the apparatus 700. The communications unit 703 is configured to support the apparatus 700 in communicating with another network entity. The apparatus 700 may further include a storage unit 701, configured to store program code and data of the apparatus 700.

The processing unit 702 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a general term. In specific implementation, the communications interface may include a plurality of interfaces. The storage unit 701 may be a memory.

In first application, the apparatus 700 may be the communications device (such as the SMF, the AMF, or the MME) in any one of the foregoing embodiments, or may be a chip that can be used for the communications device. For example, when the apparatus 700 is the communications device, the processing unit may be a processor, and the communications unit may be a transceiver. Optionally, the transceiver may include a radio frequency circuit, and the storage unit may be, for example, a memory. For example, when the apparatus 700 is the chip that can be used for the communications device, the processing unit may be a processor, and the communications unit may be an input/output interface, a pin, a circuit, or the like. The processing unit may execute a computer execution instruction stored in the storage unit. Optionally, the storage unit is a storage unit in the chip, such as a register or a cache. Alternatively, the storage unit may be a storage unit that is in the communications device and that is located outside the chip, such as a read-only memory (ROM) or another type of static storage device that can store static information and an instruction, or a random access memory (RAM).

In an embodiment, the processing unit 702 determines that a type of a terminal is an unmanned aerial vehicle UAV. The communications unit 703 sends authentication information of the terminal to an authentication server, and the authentication information is used by the authentication server to perform authentication.

In a possible implementation method, the processing unit 702 is specifically configured to: trigger, based on first policy information, the communications device to determine the type of the terminal, where the first policy information is pre-configured on the communications device or is sent by a policy control function PCF network element to the communications device; and determine, based on subscription information of the terminal that is received from a data management network element, that the type of the terminal is the UAV; or determine, based on indication information received from a data analytics network element, that the type of the terminal is the UAV, where the indication information is used to indicate that the type of the terminal is the UAV; or determine, based on the type of the terminal that is reported by the terminal, that the type of the terminal is the UAV In a possible implementation method, the communications unit 703 is configured to: after the processing unit 702 determines that the type of the terminal is the UAV, and before the communications unit 703 sends the authentication information of the terminal to the authentication server, send, to the terminal based on second policy information, a request for obtaining the authentication information. The second policy information is pre-configured on the communications device, or is from the authentication server or from the policy control function PCF network element.

In a possible implementation method, the processing unit 702 is further configured to obtain network assistance information, and the network assistance information includes location information of the terminal and/or network capacity information that are/is provided by a network. The communications unit 703 is specifically configured to send the authentication information of the terminal and the network assistance information to the authentication server.

In a possible implementation method, the communications unit 703 is specifically configured to:

add the network assistance information to a container in which the authentication information of the terminal is located, and send the container to the authentication server; or send a first container and a second container to the authentication server, where the first container includes the authentication information of the terminal, and the second container includes the network assistance information.

In a possible implementation method, the processing unit 702 is further configured to obtain the authentication information of the terminal from the terminal before the communications unit 703 sends the authentication information of the terminal to the authentication server. The authentication information includes an identifier of the terminal, location information provided by the terminal, or possible flight path information of the terminal.

In a possible implementation method, the processing unit 702 is further configured to register, before determining that the type of the terminal is the UAV, the terminal with the network. The communications unit 703 is further configured to receive, after sending the authentication information of the terminal to the authentication server, response information from the authentication server, and the response information is used to indicate that authentication on the terminal fails. The processing unit 702 is further configured to initiate a deregistration procedure of the terminal. Alternatively, the communications unit 703 is configured to send notification information to an unmanned aerial vehicle supervision cloud server, and the notification information is used to indicate that authentication on the terminal fails.

In a possible implementation method, the communications unit 703 is configured to receive a registration request message from the terminal before the processing unit 702 determines that the type of the terminal is the UAV. The registration request message is used to request to register the terminal with the network, the registration request message includes the authentication information of the terminal, and the authentication information includes an identifier of the terminal, location information provided by the terminal, or possible flight path information of the terminal.

In a possible implementation method, the communications unit 703 is further configured to: after sending the authentication information of the terminal to the authentication server, receive response information from the authentication server, where the response information is used to indicate that authentication on the terminal fails; and send a registration reject message to the terminal, or send notification information to an unmanned aerial vehicle supervision cloud server, where the notification information is used to indicate that authentication on the terminal fails.

In a possible implementation method, the communications device is an access and mobility management function AMF network element or a mobility management entity MME.

In a possible implementation method, the communications device is a session management function SMF network element or an MME. The processing unit 702 is specifically configured to determine, in a session establishment procedure of the terminal, that the type of the terminal is the UAV.

In a possible implementation method, the communications unit 703 is configured to: after sending the authentication information of the terminal to the authentication server, receive response information from the authentication server, where the response information is used to indicate that authentication on the terminal fails; and send a session establishment reject message to the terminal, or send notification information to an unmanned aerial vehicle supervision cloud server, where the notification information is used to indicate that authentication on the terminal fails.

In a possible implementation method, the processing unit 702 is further configured to: before the communications unit 703 sends the authentication information of the terminal to the authentication server, select a user plane function UPF network element; and establish a first interface between the communications device and the UPF network element, and establish a second interface between the UPF network element and the authentication server. The communications unit 703 is configured to send the authentication information of the terminal to the authentication server by using the first interface and the second interface.

In a possible implementation method, the authentication server is a data network authentication, authorization, and accounting server.

In second application, the apparatus 700 may be the terminal in any one of the foregoing embodiments, or may be a chip that can be used for the terminal. For example, when the apparatus 700 is the terminal, the processing unit may be a processor, and the communications unit may be a transceiver. Optionally, the transceiver may include a radio frequency circuit, and the storage unit may be, for example, a memory. For example, when the apparatus 700 is the chip that can be used for the terminal, the processing unit may be a processor, and the communications unit may be an input/output interface, a pin, a circuit, or the like. The processing unit may execute a computer execution instruction stored in the storage unit. Optionally, the storage unit is a storage unit in the chip, such as a register or a cache. Alternatively, the storage unit may be a storage unit that is in the terminal and that is located outside the chip, such as a ROM or another type of static storage device that can store static information and an instruction, or a RAM.

In a first embodiment, the communications unit 703 is configured to send a registration request message to a communications device. A type of the terminal is a UAV, the registration request message is used to request to register the terminal with a network, and the registration request message includes authentication information of the terminal. The communications unit 703 is configured to: receive a registration reject message from the communications device after authentication on the terminal fails, or receive a registration accept message from the communications device after authentication on the terminal succeeds.

In a possible implementation method, the authentication information includes an identifier of the terminal, location information provided by the terminal, or possible flight path information of the terminal.

In a possible implementation method, the communications device is an access and mobility management function AMF network element or a mobility management entity MME.

In a second embodiment, the communications unit 703 is configured to: send a session establishment request message to a communications device, where a type of the terminal is a UAV; and receive a session establishment reject message from the communications device after authentication on the terminal fails, or receive a session establishment complete message from the communications device after authentication on the terminal succeeds.

In a possible implementation method, the communications unit 703 is further configured to send authentication information of the terminal to the communications device based on a request of the communications device, and the authentication information is used by the communications device to perform authentication on the terminal.

In a possible implementation method, the authentication information includes an identifier of the terminal, location information provided by the terminal, or possible flight path information of the terminal.

In a possible implementation method, the communications device is an access and mobility management function AMF network element or a mobility management entity MME.

In third application, the apparatus 700 may be the authentication server in any one of the foregoing embodiments, or may be a chip that can be used for the authentication server. For example, when the apparatus 700 is the authentication server, the processing unit may be a processor, and the communications unit may be a transceiver. Optionally, the transceiver may include a radio frequency circuit, and the storage unit may be, for example, a memory. For example, when the apparatus 700 is the chip that can be used for the authentication server, the processing unit may be a processor, and the communications unit may be an input/output interface, a pin, a circuit, or the like. The processing unit may execute a computer execution instruction stored in the storage unit. Optionally, the storage unit is a storage unit in the chip, such as a register or a cache. Alternatively, the storage unit may be a storage unit that is in the authentication server and that is located outside the chip, such as a ROM or another type of static storage device that can store static information and an instruction, or a RAM.

In an embodiment, the communications unit 703 is configured to receive authentication information of a terminal from a communications device. The processing unit 702 is configured to perform authentication on the terminal based on the authentication information of the terminal.

In a possible implementation method, the communications unit 703 is further configured to receive network assistance information of the terminal from the communications device, and the network assistance information includes location information of the terminal and/or network capacity information that are/is provided by a network. The processing unit 702 is configured to perform authentication on the terminal based on the authentication information of the terminal and the network assistance information.

In a possible implementation method, the processing unit 702 is specifically configured to perform authentication on the terminal based on the authentication information of the terminal, the network assistance information, and electronic fence information, and the electronic fence information is pre-configured or is from an unmanned aerial vehicle supervision cloud server.

In a possible implementation method, the communications unit 703 is further configured to send response information to the communications device after the processing unit 702 fails to authenticate the terminal, and the response information is used to indicate that authentication on the terminal fails.

In a possible implementation method, the authentication information includes an identifier of the terminal, location information provided by the terminal, or possible flight path information of the terminal.

In a possible implementation method, the communications device is an access and mobility management function AMF network element, a mobility management entity MME, or a session management function SMF network element.

It should be noted that, for a specific implementation process and a corresponding beneficial effect of the apparatus when the apparatus is used for the foregoing unmanned aerial vehicle authentication method, refer to related description in the foregoing method embodiments, and details are not described herein again.

Figure 8:
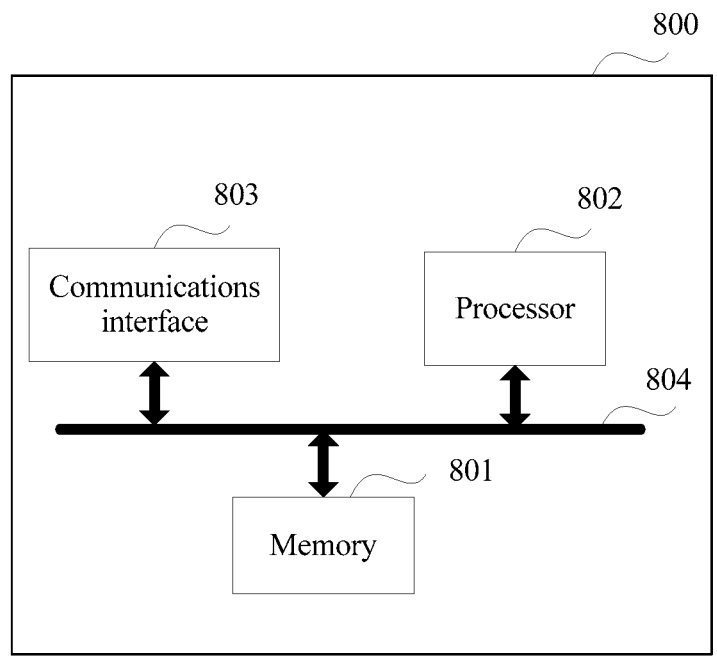
FIG. 8 is a schematic diagram of another apparatus according to this application.

FIG. 8 is a schematic diagram of an apparatus according to this application. The apparatus may be the foregoing AMF, SMF, MME, terminal, or authentication server (such as a PDN-AAA or a DN-AAA). The apparatus 800 includes a processor 802, a communications interface 803, and a memory 801. Optionally, the apparatus 800 may further include a bus 804. The communications interface 803, the processor 802, and the memory 801 may be connected to each other by using the communications line 804. The communications line 804 may be a Peripheral Component Interconnect (PCI) bus, an Extended Industry Standard Architecture (EISA) bus, or the like. The communications line 804 may be classified into an address bus, a data bus, a control bus, and the like. For ease of representation, only one thick line is used to represent the bus in FIG. 8, but this does not mean that there is only one bus or only one type of bus.

The processor 802 may be a CPU, a microprocessor, an ASIC, or one or more integrated circuits configured to control program execution in the solutions of this application.

The communications interface 803 uses any apparatus like a transceiver, and is configured to communicate with another device or a communications network, such as Ethernet, a radio access network (RAN), a wireless local area network (WLAN), or a wired access network.

The memory 801 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, or the like), a disk storage medium or another magnetic storage device, or any other medium that can be configured to carry or store expected program code having an instruction or data structure form and that can be accessed by a computer. However, this is not limited. The memory may exist independently and is connected to the processor by using the communications line 804. Alternatively, the memory may be integrated with the processor.

The memory 801 is configured to store a computer execution instruction for executing the solutions of this application, and the processor 802 controls the execution. The processor 802 is configured to execute the computer execution instruction stored in the memory 801, so as to implement the unmanned aerial vehicle authentication method provided in the foregoing embodiments of this application.

Optionally, the computer execution instruction in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor may read information from the storage medium and write information into the storage medium. Optionally, the storage medium may further be integrated into a processor. The processor and the storage medium may be disposed in the ASIC, and the ASIC may be disposed in a terminal device. Optionally, the processor and the storage medium may be disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the appended claims, and are considered as covering any or all of modifications, variations, combinations, or equivalents within the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An unmanned aerial vehicle authentication method comprising:
   determining, by a communications device belonging to a core network, that a type of a terminal is an unmanned aerial vehicle (UAV);
   obtaining, by the communications device, location information of the terminal,
   wherein the location information includes at least one of a tracking area identity, a cell identifier (ID), a local IP address of the terminal and a user datagram protocol source port number of the terminal; and
   sending, by the communications device, authentication information of the terminal and the location information to an authentication server,
   wherein the authentication information is used by the authentication server to perform take-off authentication or flight plan authentication, wherein the take-off authentication comprises checking whether the location information is a lawful take-off location of the terminal, and wherein the flight plan authentication comprises checking whether the location information is applicable for executing a flight mission.

2. The method according to claim 1, wherein determining that the type of the terminal is the UAV comprises:

determining, by the communications device, based on subscription information of the terminal received from a data management network element, or the type of the terminal that is reported by the terminal, that the type of the terminal is the UAV.

3. The method according to claim 1, wherein sending the authentication information of the terminal and the location information to the authentication server comprises:

sending, by the communications device, a first container and a second container to the authentication server, wherein the first container comprises the authentication information of the terminal, and the second container comprises the location information.

4. The method according to claim 1, wherein before sending the authentication information of the terminal to the authentication server, the method further comprises:

obtaining, by the communications device, the authentication information of the terminal from the terminal, wherein the authentication information comprises an identifier of the terminal, location information provided by the terminal, or possible flight path information of the terminal.

5. The method according to claim 1, wherein before determining that the type of the terminal is the UAV, the method further comprises:

registering, by the communications device, the terminal with the core network; and after sending the authentication information of the terminal to the authentication server, the method further comprises:

receiving, by the communications device, response information from the authentication server, wherein the response information indicates that authentication on the terminal fails; and initiating, by the communications device, a deregistration procedure of the terminal.

6. The method according to claim 1, wherein before determining that the type of the terminal is the UAV, the method further comprises:

receiving, by the communications device, a registration request message from the terminal, wherein the registration request message is used to request to register the terminal with the core network, the registration request message comprises the authentication information of the terminal, and the authentication information comprises an identifier of the terminal, location information provided by the terminal, or possible flight path information of the terminal.

7. The method according to claim 6, wherein after sending the authentication information of the terminal to the authentication server, the method further comprises:

receiving, by the communications device, response information from the authentication server, wherein the response information indicates that authentication on the terminal fails; and sending, by the communications device, a registration reject message to the terminal.

8. The method according to claim 1, wherein the communications device is a session management function (SMF) network element or a mobility management entity (MME); and wherein determining that the type of the terminal is the UAV comprises:

determining, by the communications device in a session establishment procedure of the terminal, that the type of the terminal is the UAV.

9. The method according to claim 8, wherein after sending the authentication information of the terminal to the authentication server, the method further comprises:

receiving, by the communications device, response information from the authentication server, wherein the response information indicates that authentication on the terminal fails; and sending, by the communications device, a session establishment reject message to the terminal.

10. The method according to claim 9, wherein before sending the authentication information of the terminal to the authentication server, the method further comprises:

selecting, by the communications device, a user plane function (UPF) network element; and establishing, by the communications device, a first interface between the communications device and the UPF network element, and establishing a second interface between the UPF network element and the authentication server; and wherein sending the authentication information of the terminal to the authentication server comprises sending, by the communications device, the authentication information of the terminal to the authentication server by using the first interface and the second interface.

11. A device belonging to a core network comprising: a non-transitory memory storage comprising processor-executable instructions; and at least one processor in communication with the non-transitory memory storage, wherein the at least one processor, upon execution of the processor-executable instructions, is configured to:

determine that a type of a terminal is an unmanned aerial vehicle (UAV);

obtain location information of the terminal, wherein the location information includes at least one of a tracking area identity, a cell identifier (ID), a local IP address of the terminal and a user datagram protocol source port number of the terminal; and send authentication information of the terminal and the location information to an authentication server, wherein the authentication information is used by the authentication server to perform take-off authentication or flight plan authentication, wherein the take-off authentication comprises checking whether the location information is a lawful take-off location of the terminal, and wherein the flight plan authentication comprises checking whether the location information is applicable for executing a flight mission.

12. The device according to claim 11, wherein the at least one processor is further configured to:

determine, based on subscription information of the terminal that is received from a data management network element, or the type of the terminal that is reported by the terminal, that the type of the terminal is the UAV.

13. The device according to claim 11, wherein:

the at least one processor is further configured to send a first container and a second container to the authentication server, wherein the first container comprises the authentication information of the terminal, and the second container comprises the location information.

14. The device according to claim 11, further comprising a transmitter configured to cooperate with the at least one processor to obtain the authentication information of the terminal from the terminal, wherein the authentication information comprises an identifier of the terminal, location information provided by the terminal, or possible flight path information of the terminal.

15. A system comprising a communication device, belonging to a core network, and an authentication server, wherein:
the communication device is configured to determine that a type of a terminal is an unmanned aerial vehicle (UAV), and
receive location information of the terminal, wherein the location information includes at least one of a tracking area identity, a cell identifier (ID), a local IP address of the terminal and a user datagram protocol source port number of the terminal, and
send authentication information of the terminal and the location information to the authentication server,
wherein the authentication information is used by the authentication server to perform take-off authentication or flight plan authentication,
wherein the take-off authentication comprises checking whether the location information is a lawful take-off location of the terminal, and
wherein the flight plan authentication comprises checking whether the location information is applicable for executing a flight mission; and
the authentication server is configured to
receive the authentication information of the terminal and the location information, and
perform the authentication on the terminal based on the authentication information of the terminal and the location information.

16. The system according to claim 15, wherein the communication device is configured to:
send a first container and a second container to the authentication server, wherein the first container comprises the authentication information of the terminal, and the second container comprises the location information.

17. The system according to claim 15, wherein the communication device is further configured to:
receive a registration request message from the terminal, wherein the registration request message requests to register the terminal with the core network, the registration request message comprises the authentication information of the terminal, and the authentication information comprises an identifier of the terminal, location information provided by the terminal, or possible flight path information of the terminal;
register the terminal with the core network;
receive response information from the authentication server, wherein the response information indicates that authentication on the terminal fails; and
initiate a deregistration procedure of the terminal.

18. The system according to claim 15, wherein the communications device is a session management function (SMF) network element or a mobility management entity (MME), and wherein the communication device is configured to:
determine in a session establishment procedure of the terminal, that the type of the terminal is the UAV;
the communication device is further configured to:
receive response information from the authentication server, wherein the response information indicates that authentication on the terminal fails; and
send a session establishment reject message to the terminal.

19. The device according to claim 11, wherein the at least one processor is further configured to:
receive a registration request message from the terminal, wherein the registration request message requests to register the terminal with the core network, the registration request message comprises the authentication information of the terminal, and the authentication information comprises an identifier of the terminal, location information provided by the terminal, or possible flight path information of the terminal;
register the terminal with the core network;
receive response information from the authentication server, wherein the response information indicates that authentication on the terminal fails; and
initiate a deregistration procedure of the terminal.

20. The device according to claim 11, wherein the device is a session management function (SMF) network element or a mobility management entity (MME), and the at least one processor is configured to:
determine in a session establishment procedure of the terminal, that the type of the terminal is the UAV;
the at least one processor is further configured to:
receive response information from the authentication server, wherein the response information indicates that authentication on the terminal fails; and
send a session establishment reject message to the terminal.

* * * * *